(12) United States Patent
Blankenship et al.

(10) Patent No.: US 9,871,716 B2
(45) Date of Patent: Jan. 16, 2018

(54) BROADCAST READINESS TESTING IN DISTRIBUTED CONTENT DELIVERY NETWORKS

(71) Applicant: Kontiki, Inc., Sunnyvale, CA (US)

(72) Inventors: Stephen J. Blankenship, Roseville, CA (US); Jeff S. Dallacqua, Oakland, CA (US)

(73) Assignee: KOLLECTIVE TECHNOLOGY, INC., Sunnyvale, CA (US)

( * ) Notice: Subject to any disclaimer, the term of this patent is extended or adjusted under 35 U.S.C. 154(b) by 396 days.

(21) Appl. No.: 14/516,517

(22) Filed: Oct. 16, 2014

(65) Prior Publication Data
US 2016/0112295 A1 Apr. 21, 2016

(51) Int. Cl.
H04L 12/26 (2006.01)
H04L 12/24 (2006.01)
H04L 29/06 (2006.01)

(52) U.S. Cl.
CPC .......... *H04L 43/50* (2013.01); *H04L 41/0806* (2013.01); *H04L 41/0866* (2013.01); *H04L 41/0886* (2013.01); *H04L 41/22* (2013.01); *H04L 43/045* (2013.01); *H04L 43/0817* (2013.01); *H04L 65/4076* (2013.01); *H04L 41/5067* (2013.01); *H04L 43/067* (2013.01); *H04L 43/087* (2013.01)

(58) Field of Classification Search
CPC .............................. H04L 43/50; H04L 41/0886
USPC ........................................................ 709/223
See application file for complete search history.

(56) References Cited

U.S. PATENT DOCUMENTS

| 6,785,704 | B1 * | 8/2004 | McCanne | H04L 69/329 |
| | | | | 709/201 |
| 7,089,209 | B1 | 8/2006 | Hennessey | |
| 7,349,358 | B2 | 3/2008 | Hennessey | |
| 7,363,489 | B2 | 4/2008 | Hennessey | |
| 7,373,415 | B1 | 5/2008 | Deshan et al. | |
| 7,398,301 | B2 | 7/2008 | Hennessey | |
| 7,450,524 | B2 | 11/2008 | Hennessey | |
| 7,688,741 | B2 | 3/2010 | Botton-Dascal | |
| 7,765,411 | B2 | 7/2010 | Hennessey | |
| 2014/0280522 | A1 * | 9/2014 | Watte | H04L 51/04 |
| | | | | 709/203 |

FOREIGN PATENT DOCUMENTS

WO 2011159986 A1 12/2011

* cited by examiner

*Primary Examiner* — Adnan Mirza
(74) *Attorney, Agent, or Firm* — Park, Vaughan, Fleming & Dowler LLP

(57) ABSTRACT

The disclosed embodiments provide a system that facilitates content distribution. During operation, the system obtains, at a node in a content delivery network, configuration information for a test of broadcast readiness in the content delivery network from a configuration server in the distributed content delivery network. Next, the system uses the configuration information to configure the node to participate in the test, wherein the test includes using a media delivery application on the node to play content received from the content delivery network without requiring user input to perform the test. During the test, the system uses the node to periodically provide status information associated with the node to a collection server in the content delivery network.

22 Claims, 7 Drawing Sheets

BROADCAST READINESS TESTING IN DISTRIBUTED CONTENT DELIVERY NETWORKS

RELATED APPLICATION

The subject matter of this application is related to the subject matter in a co-pending non-provisional application by inventors Wade L. Hennessey and John B. Wainwright, entitled "Method and Apparatus for Establishing Peering Rules for Distributed Content Delivery," having Ser. No. 10/611,783, and filing date 30 Jun. 2003.

The subject matter of this application is also related to the subject matter in a co-pending non-provisional application by inventors Jonathan Tash, Stephen Blankenship and Jay Harel and filed on the same day as the instant application, entitled "Adaptive Bit Rates During Broadcast Transmission in Distributed Content Delivery Networks," having serial number 14/516,528 and filing date Oct. 16, 2014.

BACKGROUND

Field

The disclosed embodiments relate to broadcast readiness testing. More specifically, the disclosed embodiments relate to techniques for testing broadcast readiness in distributed content delivery networks.

Related Art

Improvements in the capabilities and numbers of electronic devices have resulted in the increased distribution of digital content to the electronic devices. For example, video, audio, and/or other types of media streams may be transmitted to multiple personal computers, laptop computers, mobile phones, tablet computers, and/or other network-enabled electronic devices using Internet-based content providers and/or content delivery networks.

However, bandwidth consumed by digital content delivery may interfere with playback of the content and/or other network access on the electronic devices. For example, increased demand for video in a corporate environment may shift network usage in the corporate network from small transactional payloads to large distributed payloads. In turn, the corporate network may be overburdened by the payloads, resulting in an impaired video experience and/or an inability of business-critical traffic to reach devices in the corporate network.

Some companies have tried to solve this problem by creating distributed content delivery networks. In a distributed content delivery network, clients may act as peers that share content with one another. Once a client receives a file from a central server, that client becomes a potential server for that file to other clients. As clients download the content, the number of potential servers for the content grows, allowing subsequent clients to obtain the content from the Local Area Network (LAN) instead of a Wide Area Network (WAN) and reducing congestion between the clients and the WAN.

On the other hand, bandwidth and/or processor utilization may continue to impact the playback of content at individual clients of distributed content delivery networks. In addition, content delivery and/or playback issues at a client may not be detected until after the content is streamed. For example, video of a live event may be streamed to hundreds or thousands of clients across multiple networks and/or physical locations. As the number of clients, networks, and/or locations grows, the likelihood that one or more clients and/or networks are misconfigured or unavailable increases.

Moreover, an inability and/or impaired ability to deliver content to a client and/or network may not be identified until user feedback is received after the live event has concluded.

Consequently, distribution and playback of content to clients across multiple networks and/or physical locations may be facilitated by mechanisms for dynamically detecting and managing network and/or playback issues on the clients.

SUMMARY

The disclosed embodiments provide a system that facilitates content distribution. During operation, the system obtains, at a node in a content delivery network, configuration information for a test of broadcast readiness in the content delivery network from a configuration server in the content delivery network. Next, the system uses the configuration information to configure the node to participate in the test, wherein the test includes using a media delivery application on the node to play content received from the content delivery network without requiring user input to perform the test. During the test, the system uses the node to periodically provide status information associated with the node to a collection server in the content delivery network.

In some embodiments, the system also periodically transmits a request for the configuration information from the node to the configuration server prior to obtaining the configuration information from the configuration server.

In some embodiments, the system also initiates the test on the node after a start time of the test from the configuration information is reached.

In some embodiments, the system also completes the test on the node after an end time of the test from the configuration information is reached.

In some embodiments, the configuration information further includes a jitter associated with at least one of the start time and the end time.

In some embodiments, the configuration information further includes at least one of an address range, a subnet, a participation percentage, a participation level, a test stream, a hide flag, and a log transmission flag.

In some embodiments, the test further includes hiding a playback screen of the media delivery application on the node.

In some embodiments, the status information includes at least one of a playing status, a buffering status, a stalled status, a stopped status, a paused status, and a starting status.

BRIEF DESCRIPTION OF THE FIGURES

The patent or application file contains at least one drawing executed in color. Copies of this patent or patent application publication with color drawing(s) will be provided by the Office upon request and payment of the necessary fee.

In the figures, like reference numerals refer to the same figure elements.

DETAILED DESCRIPTION

The following description is presented to enable any person skilled in the art to make and use the embodiments, and is provided in the context of a particular application and its requirements. Various modifications to the disclosed embodiments will be readily apparent to those skilled in the art, and the general principles defined herein may be applied to other embodiments and applications without departing from the spirit and scope of the present disclosure. Thus, the present invention is not limited to the embodiments shown, but is to be accorded the widest scope consistent with the principles and features disclosed herein.

The data structures and code described in this detailed description are typically stored on a computer-readable storage medium, which may be any device or medium that can store code and/or data for use by a computer system. The computer-readable storage medium includes, but is not limited to, volatile memory, non-volatile memory, magnetic and optical storage devices such as disk drives, magnetic tape, CDs (compact discs), DVDs (digital versatile discs or digital video discs), or other media capable of storing code and/or data now known or later developed.

The methods and processes described in the detailed description section can be embodied as code and/or data, which can be stored in a computer-readable storage medium as described above. When a computer system reads and executes the code and/or data stored on the computer-readable storage medium, the computer system performs the methods and processes embodied as data structures and code and stored within the computer-readable storage medium.

Furthermore, methods and processes described herein can be included in hardware modules or apparatus. These modules or apparatus may include, but are not limited to, an application-specific integrated circuit (ASIC) chip, a field-programmable gate array (FPGA), a dedicated or shared processor that executes a particular software module or a piece of code at a particular time, and/or other programmable-logic devices now known or later developed. When the hardware modules or apparatus are activated, they perform the methods and processes included within them.

Figure 1:
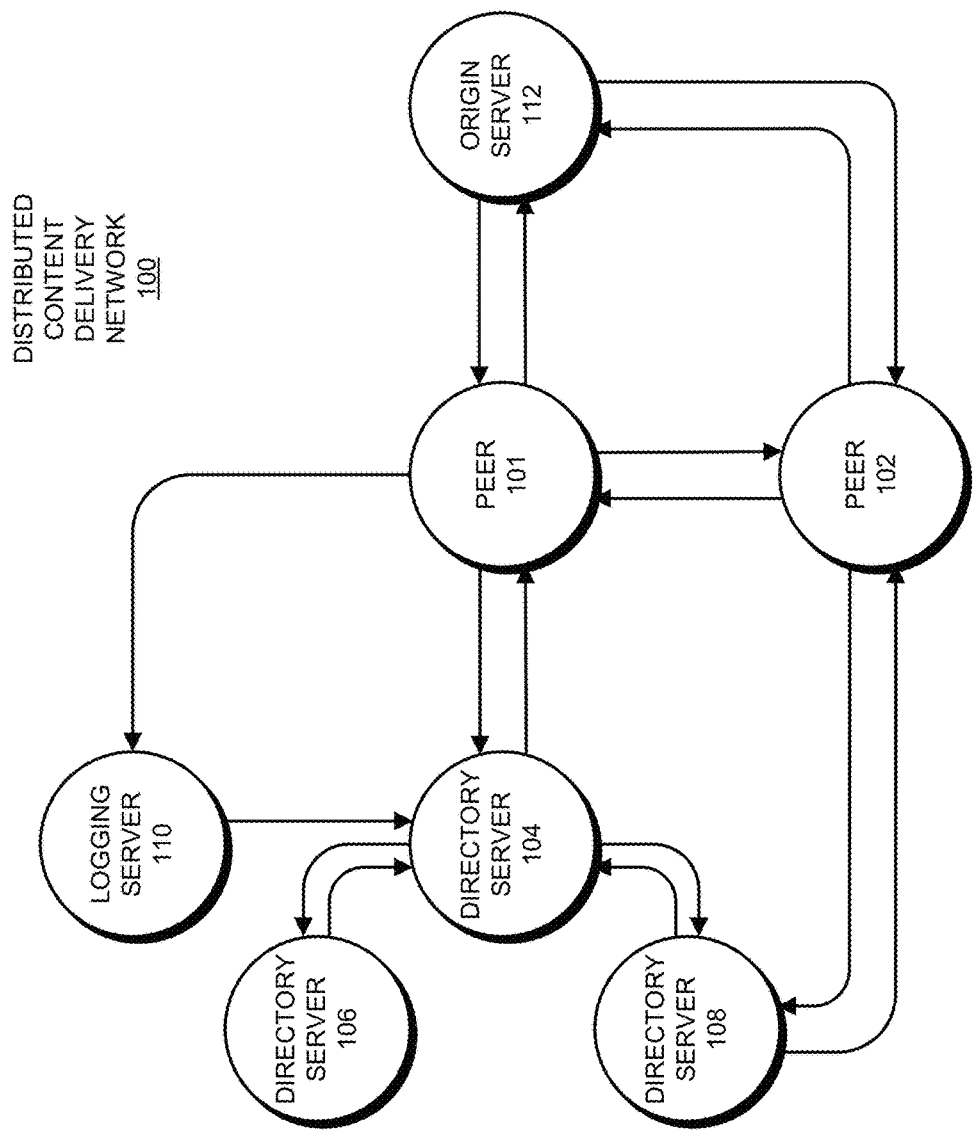
FIG. 1 shows a distributed content delivery network in accordance with the disclosed embodiments.

FIG. 1 illustrates a distributed content delivery network 100 in accordance with an embodiment of the present invention. Distributed content delivery network 100 contains peer 101 and peer 102. Peers 101 and 102 may be network-enabled electronic devices such as personal computers, laptop computers, tablet computers, mobile phones, and/or personal digital assistants that act as nodes on distributed content delivery network 100. More specifically, peers 101 and 102 may act as both clients and candidate servers that serve content to other clients. FIG. 1 also contains directory servers 104, 106 and 108, logging server 110, and origin server 112. Servers 104, 106, 108, 110 and 112 may be physical and/or virtual servers that service requests from clients (e.g. peers 101-102) in distributed content delivery network 100.

In one or more embodiments, peer 101 sends a request for content to directory server 104. The content may include streaming media such as video, audio, and/or multimedia. For example, peer 101 may request streaming video content during a live event such as a presentation, announcement, corporate meeting, ceremony, speech, news broadcast, and/or sporting event. Alternatively, peer 101 may request video and/or audio content on demand from directory server 104.

Directory server 104 may optionally forward or redirect the request to directory server 106 or directory server 108. One or more directory servers 104-108 may process the request by sending a list of potential candidate servers back to peer 101. Note that any time a peer makes a request for content, that peer becomes a potential candidate server for the content and may appear in the list of potential candidate servers that is forwarded to other clients. This list of potential candidate servers may optionally identify origin server 112, which may act as the original source for the content.

Peer 101 may use the list to request content from peer 102, origin server 112, and/or another candidate server in the list. During receipt of the content, peer 101 may provide feedback information to logging server 110, including the portions of content received and the servers from which peer 101 has attempted to download the content. Logging server 110 may subsequently forward the feedback information from peer 101 to directory server 104, and directory server 104 may use the feedback information to process future requests for the content. The components of FIG. 1 are described in further detail below in a co-pending non-provisional application by inventors Wade L. Hennessey and John B. Wainwright, entitled "Method and Apparatus for Establishing Peering Rules for Distributed Content Delivery," having Ser. No. 10/611,783, and filing date 30 Jun. 2003, which is incorporated herein by reference.

Those skilled in the art will appreciate that streaming of a live event to peers (e.g., peers 101 and 102) across multiple networks and/or physical locations of distributed content delivery network 100 may result in different playback experiences at different peers. For example, a video stream of an event may be provided by origin server 112 to one or more peers with a pre-specified lag (e.g., 30 seconds) behind the event. As the number of peers streaming the event grows, the chance that some of the nodes and/or networks through which the nodes receive the content stream are misconfigured and/or unable to receive the content stream increases. Moreover, such network and/or playback issues may not be detected until after the event has been streamed. For example, an administrator of distributed content delivery network 100 may not be notified of a peer's inability to receive the content stream during the event until a user of the peer provides feedback related to his/her user experience of the event.

In one or more embodiments, distributed content delivery network 100 includes functionality to facilitate broadcasting of live events by performing to-scale broadcast readiness testing of peers participating in such broadcasting. As discussed in further detail below, distributed content delivery network 100 may provide configuration information for a test of broadcast readiness to peers in distributed content delivery network 100. For example, the configuration information may be sent to the peers prior to a broadcast of a live event in which the peers are participants. The peers may use the configuration information to configure themselves to participate in the test and provide status information to distributed content delivery network 100 during the test. The status information may then be used to identify and/or manage potential issues associated with streaming of content to the peers and/or playback of the content at the peers, thus facilitating broadcast readiness in distributed content delivery network 100.

Figure 2:
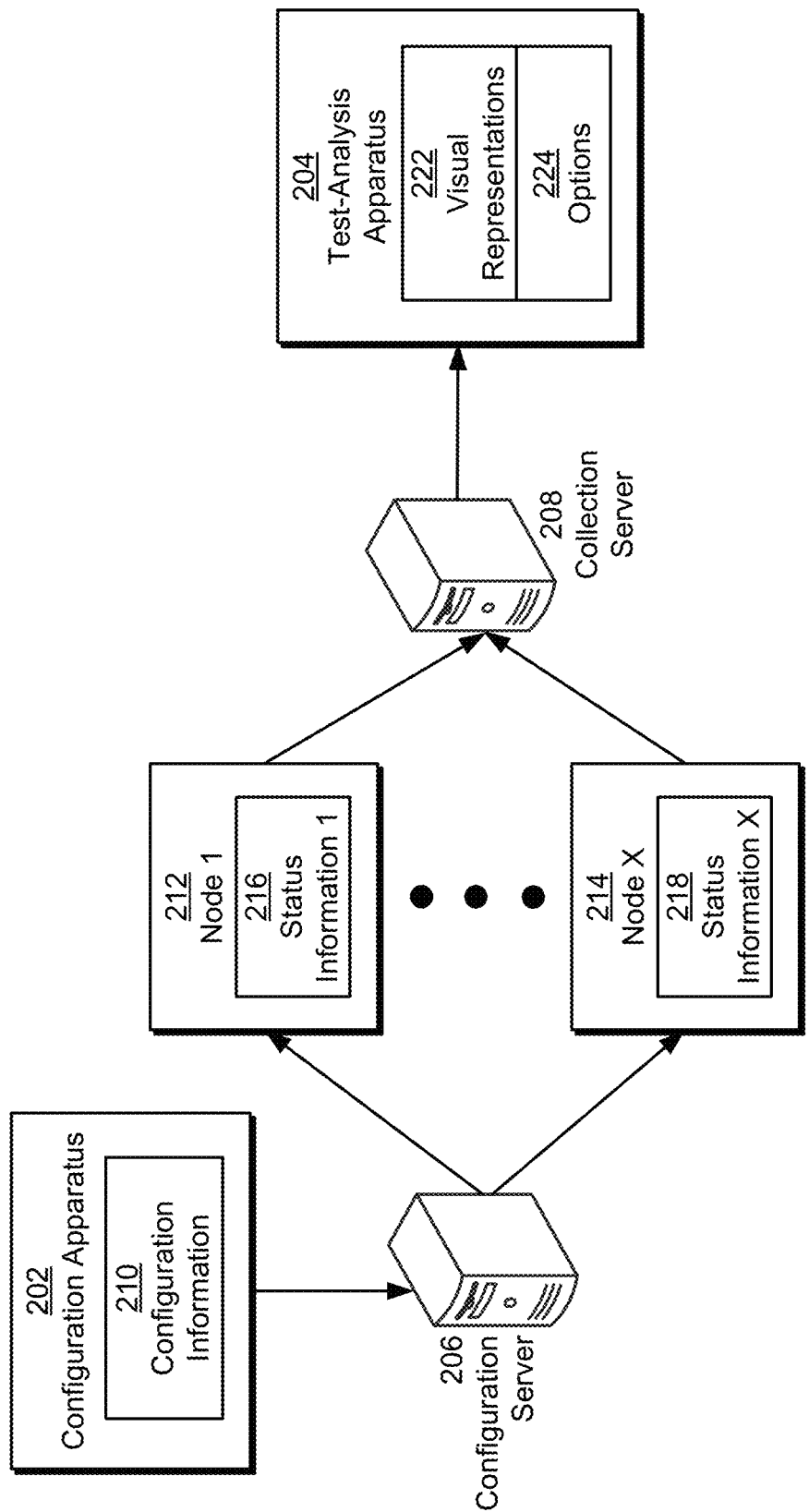
FIG. 2 shows a system for facilitating content distribution in accordance with the disclosed embodiments.

FIG. 2 shows a system for facilitating content distribution in accordance with the disclosed embodiments. As shown in FIG. 2, the system includes a configuration apparatus 202, a test-analysis apparatus 204, a configuration server 206, a collection server 208, and a set of nodes (e.g., node 1 212, node x 214). Each of these components is described in further detail below.

As mentioned above, the system of FIG. 2 may be used to perform broadcast readiness testing in a content delivery network, such as distributed content delivery network 100 of FIG. 1. During such broadcast readiness testing, content may be streamed and played at or above the scale of a broadcast of a live event (e.g., with a pre-specified lag) to identify and/or avert potential network and/or playback issues on one or more nodes of the distributed content delivery network before the live event occurs. In other words, broadcast readiness testing may be performed to ensure high quality streaming and playback of live or near-live content on a set of nodes (e.g., node 1 212, node x 214) in the content delivery network.

First, configuration apparatus 202 may obtain configuration information 210 for a test of broadcast readiness in the content delivery network. For example, configuration apparatus 202 may provide a graphical user interface (GUI), command-line interface (CLI), and/or other type of user interface for obtaining configuration information 210 from an administrator of the distributed content delivery network. Configuration apparatus 202 may also allow the administrator and/or another user to upload a configuration file containing configuration information 210, in lieu of or in addition to providing configuration information 210 through a user interface.

Next, configuration server 206 may provide configuration information 210 to a set of nodes (e.g., node 1 212, node x 214) participating in the test. For example, configuration information 210 may be uploaded from configuration apparatus 202 to configuration server 206, and configuration server 206 may provide configuration information 210 in an Extensible Markup Language (XML) document and/or other structured data to a node after receiving a request for configuration information 210 from the node.

In one or more embodiments, nodes participating in the test are peers (e.g., peers 101 and 102 of FIG. 1) in the content delivery network. For example, each node may include a native media delivery application running on an electronic device that obtains content from the distributed content delivery network, plays the content to a user of the electronic device, and/or provides the content to other nodes in the distributed content delivery network. Alternatively, the content delivery network may include client nodes that obtain content directly from one or more servers in the content delivery network and do not engage in peering with one another.

To enable participation of the nodes in the test, each node may be configured to periodically request configuration information 210 from configuration server 206. For example, a node may request and retrieve configuration information 210 from configuration server 206 every two to 12 hours.

If peer-to-peer distribution of content is used in the content delivery network, the nodes may include one or more peer leaders that obtain content from sources outside their local networks and provide the content to other nodes and/or peers in the local networks. As a result, the content may be sent only once to the local networks, thus reducing bandwidth consumption between the local networks and a Wide Area Network (WAN) from which the content is received. Moreover, the peer leaders may have more information related to streaming of the content from the sources than nodes served by the peer leaders, and may be allowed to make decisions based on the information, as discussed in a co-pending non-provisional application by inventors Jonathan Tash, Stephen Blankenship and Jay Harel and filed on the same day as the instant application, entitled "Adaptive Bit Rates During Broadcast Transmission in Distributed Content Delivery Networks," having serial number TO BE ASSIGNED and filing date TO BE ASSIGNED, which is incorporated herein by reference.

Configuration information 210 may include parameters used to perform the test. For example, configuration information 210 may identify a content item (e.g., media file) to be streamed in the test, timestamps representing start and end times of the test, and/or jitters for randomizing the start and/or end times across multiple nodes (e.g., to mitigate network spikes caused by concurrent streaming of content on all nodes). Configuration information 210 may also include a number of filters for including nodes in the test and/or excluding nodes from the test, such as filters for usernames, node identifiers, subnetworks, and/or address ranges (e.g., of Internet Protocol (IP) addresses). Configuration information 210 may further include a participation percentage representing the percentage of nodes participating in the test; if the participation percentage is less than 100, a subset of nodes representing the participation percentage may be randomly selected for participation in the test. Configuration information 210 may additionally include parameters for receiving error logs from the nodes, including a flag for enabling receipt of error logs from the nodes, a flag for receiving error logs only from nodes that are peer leaders (e.g., primary peers) during the test, a period (e.g., number of hours) during which any node that has been a peer leader (e.g., even before the test) should send its error logs, and/or a jitter for randomizing the transmission of logs from the nodes after the test ends. Finally, configuration information 210 may include parameters for hiding or displaying the event on the nodes and/or skipping streaming of the content item during the test.

Configuration information 210 from configuration server 206 may thus be used to configure the nodes to participate in the test. For example, each node may obtain the start and end times for the test (e.g., with or without randomized jitter) from configuration information 210. After the start time is reached by the local system clock and/or a synchronized clock on the node, the node may initiate the test by obtaining a stream of a content item from a server (e.g., origin server 112 of FIG. 1) and/or another node (e.g., a peer) in the content delivery network. The node may play the stream (e.g., in a hidden window and/or playback screen) until the stream ends and/or the end time of the test is reached.

During the test, the nodes may provide status information (e.g., status information 1 216, status information x 218) associated with the node to collection server 208. The status information may specify one or more statuses experienced by the nodes during the test. For example, the status information may include a starting status indicating the initiation of playback of content on the node, a playing status indicating normal playback of content, and/or a buffering status indicating receipt of the content stream at a rate that cannot support continued playback (e.g., a lower rate than the bit rate of the content stream). The status information may also specify a stalled status representing the node's inability to receive the content stream, a stopped status indicating stopping of playback on the node, and/or a paused status indicating pausing of playback on the node.

To conserve bandwidth during the test, the status information may be provided in periodic status updates from the nodes. For example, each node may provide status updates to collection server 208 every five minutes during the test. Each status update may specify one or more statuses experienced by the node in the previous five minutes, along with time intervals during which each status was experienced. The status update may also be encoded in a protocol buffer to facilitate efficient transmission of the status update to collection server 208. To further conserve bandwidth, transmission of status updates may be omitted by nodes except peer leaders, which have more information than nodes served by the peer leaders. Such limited transmission of status updates may be specified in configuration information 210 prior to the test.

Each node may complete the test once the end time of the test specified in the node's copy of configuration information 210 is reached by the node (e.g., according to the system clock and/or a synchronized clock on the node). For example, the node may close a connection used to obtain a content stream from another node and/or a server in the content delivery network once a time on the node reaches a timestamp from configuration information 210 representing the end time of the test. After the test has completed, the node may transmit error logs to collection server 208 and/or another component of the content delivery network, if transmission of error logs from the node is enabled in configuration information 210.

Test-analysis apparatus 204 may then obtain the status information for the nodes from collection server 208 and display one or more visual representations 222 of the status information to a user such as an administrator of the content delivery network. For example, test-analysis apparatus 204 may show bars containing color-coded segments representing different statuses experienced by the nodes during the test, as described in further detail below with respect to FIG. 3A. Test-analysis apparatus 204 may also show one or more charts of aggregate data associated with the test over time, as described in further detail below with respect to FIG. 3B.

Test-analysis apparatus 204 may also provide one or more options 224 for updating the displayed visual representations 222. For example, test-analysis apparatus 204 may include filters, sorting options, and/or timescales for updating visual representations 222.

By using broadcast readiness testing to provide information associated with at-scale streaming and playback of content on nodes in the content delivery network, the system of FIG. 2 may enable the identification of potential issues associated with streaming of a live event before the live event occurs. In turn, such issues may be managed and/or fixed before the live event, thus improving the broadcast readiness of the content delivery network and/or user experiences during streaming of the live event. Conversely, if few to no issues are found during the test, the broadcast readiness of the content delivery network may be verified. Moreover, because such testing is conducted using natively installed media delivery applications running on electronic devices, tests may be performed without the input and/or knowledge of users of the electronic devices, thereby facilitating the deployment of the tests at or even above the scale of the live events for which broadcast readiness is to be tested.

Those skilled in the art will appreciate that the system of FIG. 2 may be implemented in a variety of ways. First, configuration apparatus 202, test-analysis apparatus 204, configuration server 206, and collection server 208 may be implemented as a single physical machine, multiple computer systems, one or more virtual machines, a grid, one or more databases, one or more filesystems, and/or a cloud computing system. For example, configuration server 206 and/or collection server 208 may be provided by directory servers 104-108, logging server 110, origin server 112, and/or other components of distributed content delivery network 100 of FIG. 1.

Moreover, configuration apparatus 202, test-analysis apparatus 204, configuration server 206, and collection server 208 may be implemented together and/or separately by one or more hardware and/or software components and/or layers. For example, configuration apparatus 202 and configuration server 206 may be provided by the same hardware and/or software component, or configuration apparatus 202 and configuration server 206 may be implemented by separate components. Similarly, the functionality of collection server 208 and test-analysis apparatus 204 may be provided by the same or different hardware and/or software components.

Figure 3A:
FIG. 3A shows an exemplary screenshot in accordance with the disclosed embodiments.

FIG. 3A shows an exemplary screenshot in accordance with the disclosed embodiments. More specifically, FIG. 3A shows an exemplary screenshot of a user interface for providing a visual representation 302 of status information for a set of nodes in a content delivery network. The status information may be collected from the nodes during a test of broadcast readiness in the content delivery network, in which a media delivery application on each node is used to obtain and play content from the content delivery network without requiring user input and/or user knowledge to perform the test. For example, the status information may be provided by the nodes in regular status updates during playback of the content provided by the test on the nodes. Status information from the nodes may then be aggregated by a collection server (e.g., collection server 208 of FIG. 2) and displayed to a user by a test-analysis apparatus (e.g., test-analysis apparatus 204 of FIG. 2) in one or more visual representations, such as visual representation 302.

As shown in FIG. 3A, visual representation 302 includes a series of color-coded bars organized into rows, with each row representing the statuses experienced by a different node during the test. Green may represent normal playback of content on a node, red may represent impaired playback such as buffering or stalling, and blank, uncolored space may represent stopped playback. In addition, the length and position of a color in a bar in visual representation 302 may represent the time interval during which the corresponding status was experienced by a node. For example, a bar with short portions of red alternating with longer portions of green may indicate brief periods of impaired and/or unavailable playback, while a bar containing a long red segment in the middle may indicate a longer, drawn-out period of impaired and/or unavailable playback around the middle of the test.

The user interface of FIG. 3A also includes information 304 related to the nodes represented by the bars in visual representation 302. For example, information 304 may include columns of node identifiers, test start times, computer names, IP addresses, usernames, and/or locations associated with the nodes. Information 304 may be used to identify nodes, subnetworks, address ranges, and/or other attributes associated with potential network and/or playback issues during the test. In turn, information 304 and visual representation 302 may facilitate the configuration of problematic nodes and/or networks in a way that alleviates or fixes the issues before a broadcast of a live event for which the test is being performed.

The user interface may also provide a number of options 308 for updating visual representation 302 and/or information 304. For example, options 308 may include filters for node identifier, start time, computer name, IP address, and/or a percentage or duration of a certain status during the test. Options 308 may also allow the user to sort information 304 and/or bars in visual representation 302 by node identifier, start time, computer name, IP address, username, location, and/or one or more attributes of the bars by selecting the column headers (e.g., "NodeId," "StartTime," "Computer-Name," "IP", Username," "Locality," "EventData") of the corresponding columns in the user interface.

Finally, the user may change the timescale of the bars in visual representation 302 using a user-interface element 306. For example, user-interface element 306 may be a slider that allows a user to change the amount of time represented by a pixel width in the bars of visual representation 302. The user may move the slider to the right to "zoom out" and view the color-coded status information across a larger time scale, or the user may move the slider to the left to "zoom in" and view the status information at a finer granularity.

Figure 3B:
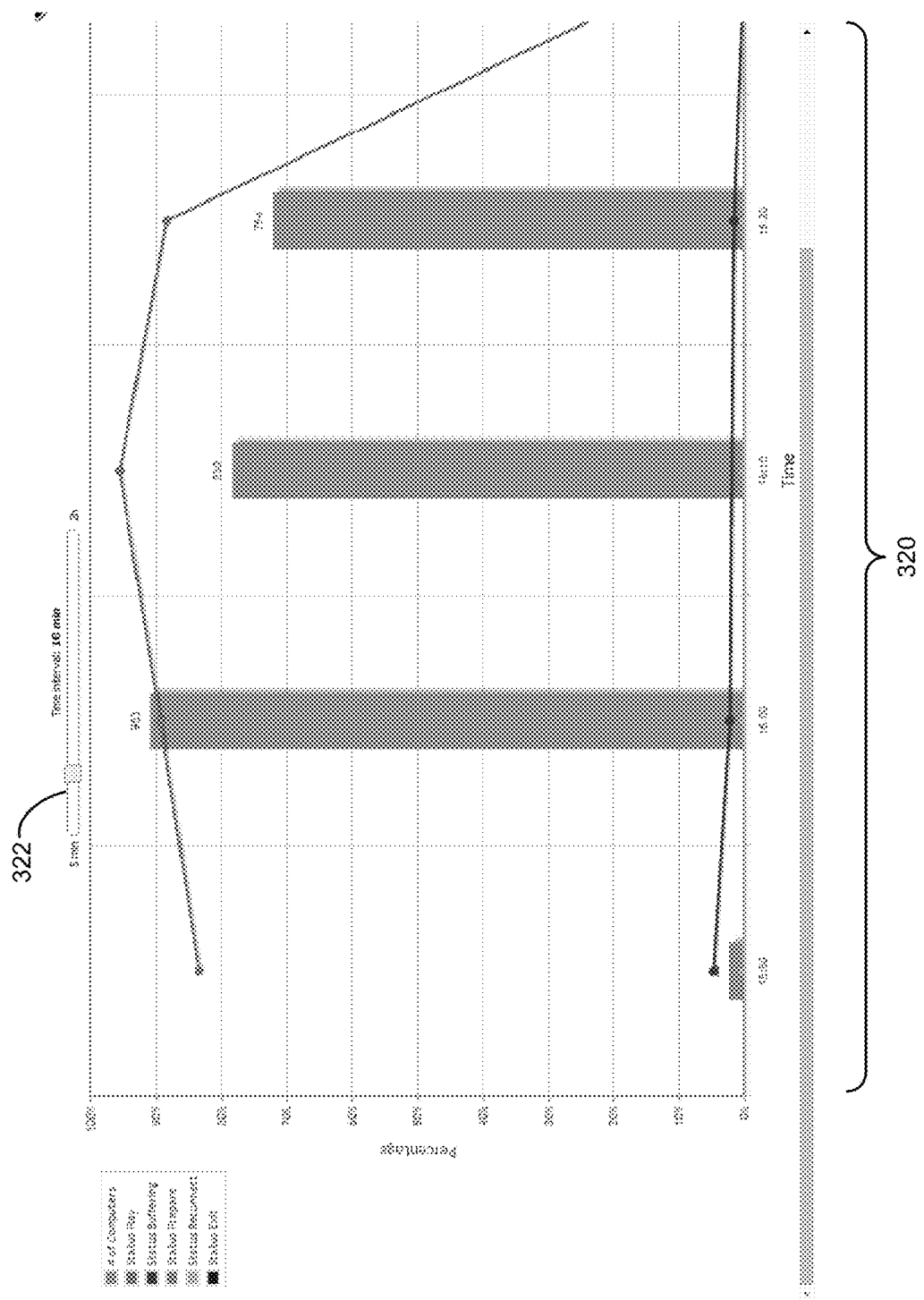
FIG. 3B shows an exemplary screenshot in accordance with the disclosed embodiments.

FIG. 3B shows an exemplary screenshot in accordance with the disclosed embodiments. More specifically, FIG. 3B shows an exemplary screenshot of a user interface for providing a visual representation 320 of status information for a set of nodes in a content delivery network. Unlike visual representation 302 of FIG. 3A, visual representation 320 includes a chart of aggregate status information for nodes in a test of broadcast readiness. For example, visual representation 320 may be accessed by selecting the "Show Aggregate Data" button in the user interface of FIG. 3A.

Within visual representation 320, the percentages of nodes associated with various attributes and/or statuses are shown over time. For example, four vertical blue bars in visual representation 320 may represent node participation during the test and indicate that node participation in the test was initially low at 15:50, reached a maximum at 16:00, decreased slightly at 16:10, and decreased again slightly at 16:20. A green line in visual representation 320 may represent normal playback during the test and indicate that the percentage of nodes experiencing normal playback started at above 80%, increased to around 95% at 16:10, decreased to below 90% at 16:20, and fell sharply afterward (e.g., as nodes stop participating in the test). Conversely, a red line in visual representation 320 may represent impaired playback (e.g., buffering) during the test and indicate that the percentage of nodes experiencing impaired playback started at around 5% and continued to drop over the next 30 minutes. Finally, a yellow line along the bottom of visual representation 320 may represent a reconnect (e.g., stalled) status during the test and indicate that the percentage of nodes in the reconnect status remained low throughout the test. Consequently, visual representation 320 may be used to identify overall trends associated with node participation and/or statuses during the test.

The user interface may further include a user-interface element 322 that allows a user to change the time scale of visual representation 320. For example, user-interface element 322 may be a slider that allows a user to change the time interval represented and/or covered by each bar and/or point in visual representation 320. The user may drag the slider to the right to increase the time interval, or the user may drag the slider to the left to decrease the time interval.

Figure 4:
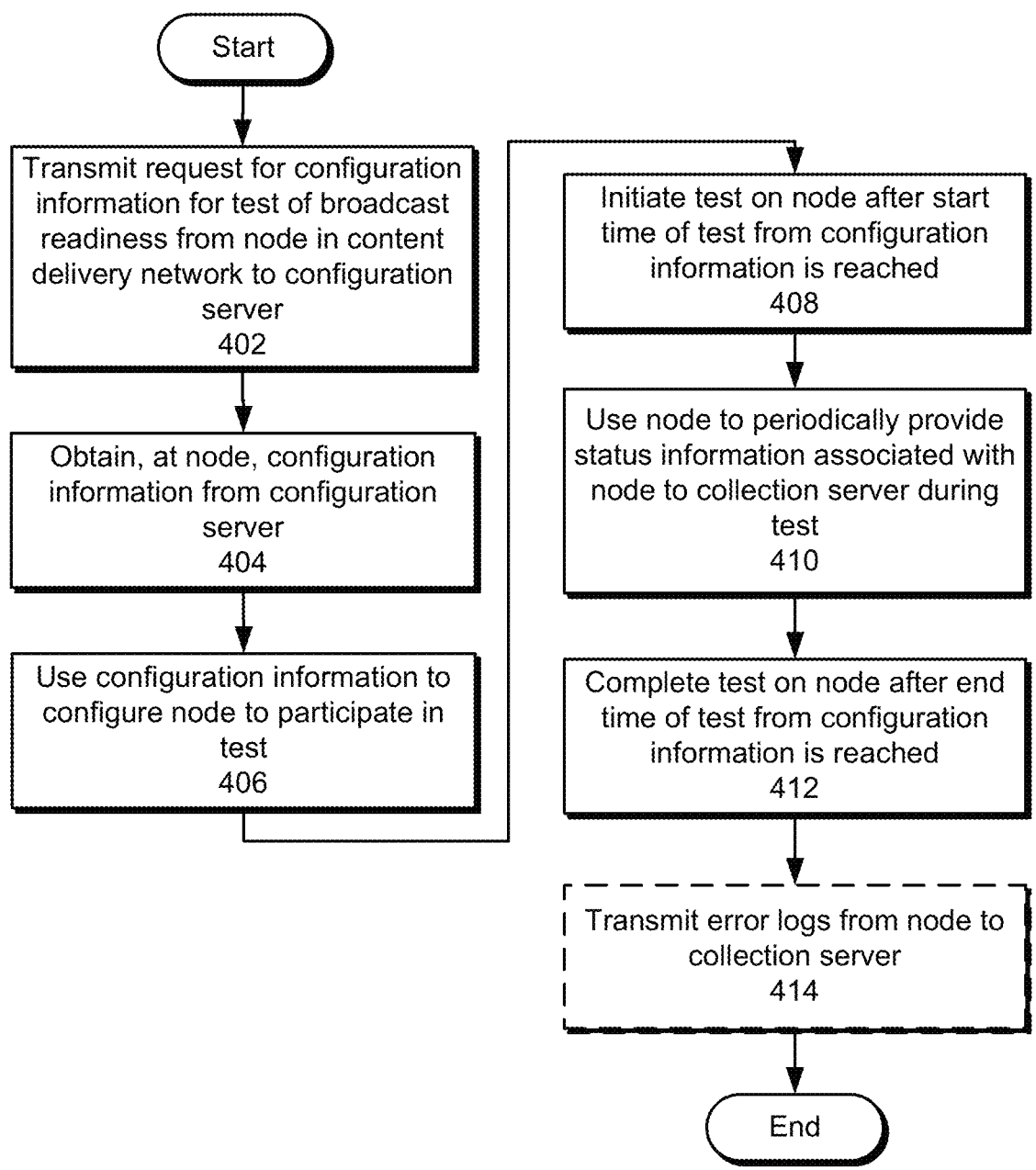
FIG. 4 shows a flowchart illustrating the process of facilitating content distribution in accordance with the disclosed embodiments.

FIG. 4 shows a flowchart illustrating the process of facilitating content distribution in accordance with the disclosed embodiments. In one or more embodiments, one or more of the steps may be omitted, repeated, and/or performed in a different order. Accordingly, the specific arrangement of steps shown in FIG. 4 should not be construed as limiting the scope of the embodiments.

Initially, a request for configuration information for a test of broadcast readiness is transmitted from a node in a content delivery network to a configuration server (operation 402) in the content delivery network. The request may be made periodically by the node (e.g., one or more times a day). In response to the request, the configuration information may be obtained from the configuration server at the node (operation 404). For example, the configuration server may transmit the configuration information in an XML document and/or other structured data to the node after receiving the request from the node. The configuration information may include a start time, an end time, a jitter, an address range, a subnet, a participation percentage, a participation level, a test stream, a hide flag, and/or a log transmission flag.

Next, the configuration information is used to configure the node to participate in the test (operation 406). For example, the configuration information may be used by the node to determine whether the node is to participate in the test or not. If the node is a participant in the test, the node may use the configuration information to set up a request for content to be played by a media delivery application on the node and/or hide a playback screen used to play the content on the media delivery application. Similarly, the node may create an error log to be updated during the test. Finally, the node may use the start and end times of the test from the configuration information to determine when to request and play content from the content delivery network.

In particular, the node may initiate the test after the start time of the test from the configuration information is reached (operation 408). After the test is initiated, the node may obtain content from the content delivery network and play the content using the media delivery application. For example, a server in the content delivery network may broadcast the content directly to the node and/or other nodes in the content delivery network, or the node may obtain the content from another node (e.g., a peer) in the content delivery network. In addition, the test may be conducted without user input and/or knowledge. For example, the node may run as a background process on a user's electronic device and participate in the test by receiving the content from one or more other nodes of the content delivery network and playing the content in a hidden playback screen on the electronic device.

During the test, the node periodically provides status information associated with the node to a collection server (operation 410) in the content delivery network. For example, the node may transmit a status update every few minutes, which contains one or more statuses experienced by the node since the previous status update, as well as time intervals during which the statuses were experienced. The status update may be encoded in a protocol buffer to reduce bandwidth consumption at the node. The statuses may include a playing status, a buffering status, a stalled status, a stopped status, a paused status, and/or a starting status.

The node may complete the test after the end time of the test from the configuration information is reached (operation 412). For example, the node may stop reporting status information, downloading content associated with the test, and/or playing the content after the end time is reached by a local system clock and/or a synchronized clock on the node. The node may optionally transmit error logs to the collection server (operation 414). For example, the node may provide the error logs to the collection server if transmission of error logs by the node is specified in the configuration information. The error logs and/or status information may then be provided in one or more visual representations to a user, as discussed in further detail below with respect to FIG. 5.

Figure 5:
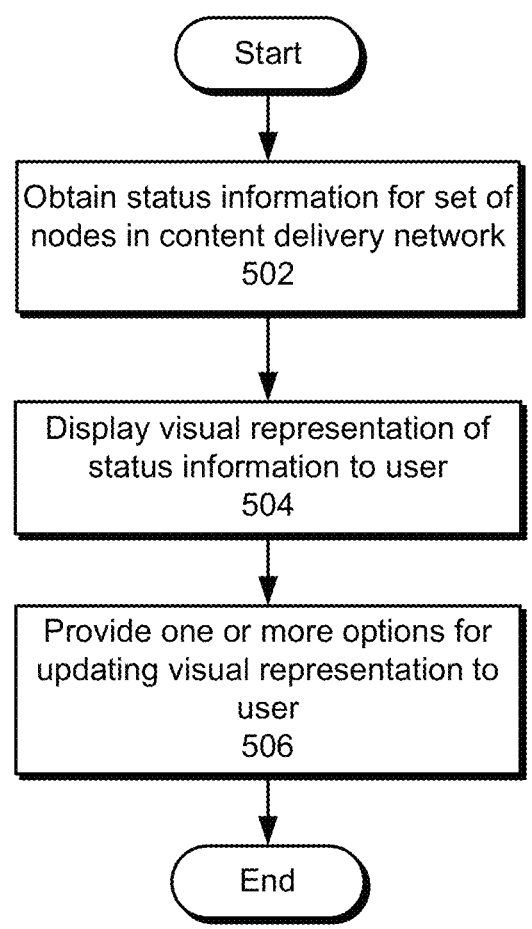
FIG. 5 shows a flowchart illustrating the process of facilitating network testing in accordance with the disclosed embodiments.

FIG. 5 shows a flowchart illustrating the process of facilitating network testing in accordance with the disclosed embodiments. In one or more embodiments, one or more of the steps may be omitted, repeated, and/or performed in a different order. Accordingly, the specific arrangement of steps shown in FIG. 5 should not be construed as limiting the scope of the embodiments.

First, status information for a set of nodes in a content delivery network is obtained (operation 502). The status information may be aggregated by a collection server in the content delivery network. For example, the status information may be transmitted to the collection server in periodic status updates from the nodes during the test.

Next, a visual representation of the status information is displayed to a user (operation 504). For example, a bar containing color-coded segments may be displayed for each node from which the status information was received, with different colors in the bar representing different statuses experienced by the node during the test. Alternatively, the visual representation may include a bar and/or line chart of aggregate node participation and/or statuses across different time intervals in the test.

Finally, one or more options for updating the visual representation are provided to the user (operation 506). For example, the options may include filters, sorting options, and/or timescales for updating the visual representation. The visual representation and/or options may thus facilitate the identification of potential issues and/or trends associated with streaming and playback of content on the nodes. In turn, the visual representation and/or options may improve the broadcast readiness of the nodes before a live event is streamed to the nodes.

Figure 6:
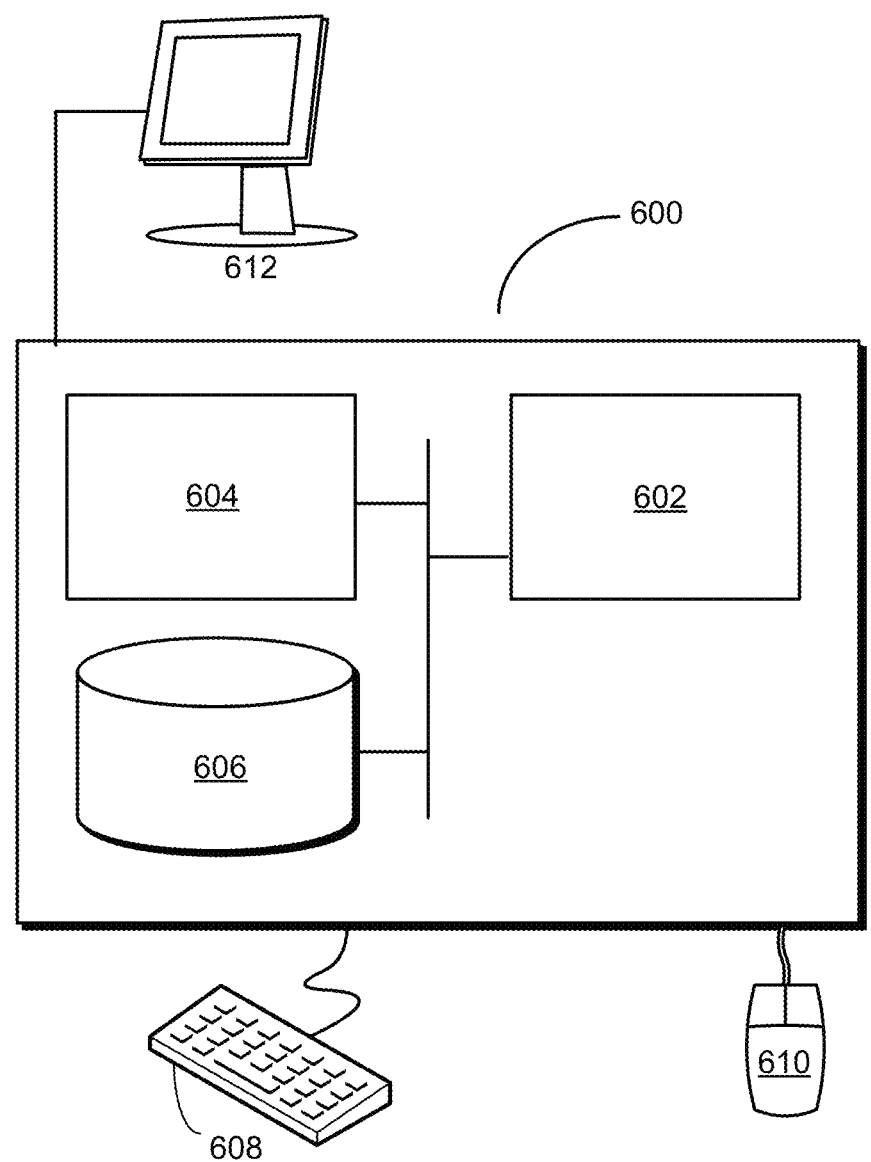
FIG. 6 shows a computer system in accordance with the disclosed embodiments.

FIG. 6 shows a computer system 600 in accordance with an embodiment. Computer system 600 includes a processor 602, memory 604, storage 606, and/or other components found in electronic computing devices. Processor 602 may support parallel processing and/or multi-threaded operation with other processors in computer system 600. Computer system 600 may also include input/output (I/O) devices such as a keyboard 608, a mouse 610, and a display 612.

Computer system 600 may include functionality to execute various components of the present embodiments. In particular, computer system 600 may include an operating system (not shown) that coordinates the use of hardware and software resources on computer system 600, as well as one or more applications that perform specialized tasks for the user. To perform tasks for the user, applications may obtain the use of hardware resources on computer system 600 from the operating system, as well as interact with the user through a hardware and/or software framework provided by the operating system.

In one or more embodiments, computer system 600 provides a system for facilitating content distribution. The system may include a configuration apparatus that obtains configuration information for a test of broadcast readiness in the content delivery network from a user. The test may use media delivery applications on a set of nodes in the content delivery network to play content received from the content delivery network without requiring user input to perform the test. The system may also include a configuration server that provides the configuration information to the set of nodes, wherein the configuration information is used by the nodes to participate in the test.

Alternatively, the system may implement a node in the content delivery network. The node may periodically obtain the configuration information from the configuration server and use the configuration information to configure the node to participate in the test. During the test, the node may periodically provide status information associated with the node to a collection server in the content delivery network.

Finally, the system may provide a test-analysis apparatus. The test-analysis apparatus may obtain the status information from the collection server and display a visual representation of the status information to a user. The test-analysis apparatus may also provide one or more options for updating the visual representation to the user.

In addition, one or more components of computer system 600 may be remotely located and connected to the other components over a network. Portions of the present embodiments (e.g., configuration apparatus, configuration server, nodes, test-analysis apparatus, collection server, etc.) may also be located on different nodes of a distributed system that implements the embodiments. For example, the present embodiments may be implemented using a cloud computing system that performs at-scale broadcast readiness testing of a set of remote nodes before streaming of a live event to the nodes.

The foregoing descriptions of various embodiments have been presented only for purposes of illustration and description. They are not intended to be exhaustive or to limit the present invention to the forms disclosed. Accordingly, many modifications and variations will be apparent to practitioners skilled in the art. Additionally, the above disclosure is not intended to limit the present invention.

What is claimed is:

1. A computer-implemented method for facilitating content distribution, comprising:
   obtaining, at a node in a content delivery network, configuration information for a test of broadcast readiness in the content delivery network from a configuration server in the content delivery network;
   using the configuration information to configure the node to participate in the test without user knowledge, wherein the test comprises using a media delivery application on the node to play content received from the content delivery network without requiring user input to perform the test; and
   during the test, using the node to periodically provide status information associated with the node to a collection server in the content delivery network.

2. The computer-implemented method of claim 1, further comprising:
   periodically transmitting a request for the configuration information from the node to the configuration server prior to obtaining the configuration information from the configuration server.

3. The computer-implemented method of claim 1, further comprising:
   initiating the test on the node after a start time of the test from the configuration information is reached.

4. The computer-implemented method of claim 3, further comprising:
   completing the test on the node after an end time of the test from the configuration information is reached.

5. The computer-implemented method of claim 4, wherein the configuration information further comprises a jitter associated with at least one of the start time and the end time.

6. The computer-implemented method of claim 4, wherein the configuration information further comprises at least one of an address range, a subnet, a participation percentage, a participation level, a test stream, a hide flag, and a log transmission flag.

7. The computer-implemented method of claim 1, wherein the test further comprises hiding a playback screen of the media delivery application on the node.

8. The computer-implemented method of claim 1, wherein the status information comprises at least one of a playing status, a buffering status, a stalled status, a stopped status, a paused status, and a starting status.

9. A computer-implemented method for facilitating network testing, comprising:
    obtaining status information for a set of nodes in a content delivery network, wherein the status information is associated with playback of content from the content delivery network on media delivery applications on the nodes;
    displaying a visual representation of the status information to a user; and
    providing one or more options for updating the visual representation to the user.

10. The computer-implemented method of claim 9, wherein the status information comprises at least one of a playing status, a buffering status, a stalled status, a stopped status, a paused status, and a starting status.

11. The computer-implemented method of claim 9,
    wherein the status information is generated by the nodes during a test of broadcast readiness in the content delivery network, and
    wherein the test of broadcast readiness comprises using a media delivery application on each of the nodes to play content received from the content delivery network without requiring user input to perform the test.

12. The computer-implemented method of claim 9, wherein the one or more options comprise at least one of a filter, a sorting option, and a timescale.

13. A system for facilitating content distribution, comprising:
    a configuration apparatus configured to obtain configuration information for a test of broadcast readiness in the content delivery network from a user, wherein the test comprises using media delivery applications on a set of nodes in the content delivery network to play content received from the content delivery network without requiring user input to perform the test; and
    a configuration server configured to provide the configuration information to the set of nodes, wherein the configuration information is used by the nodes to participate in the test.

14. The system of claim 13, further comprising:
    the set of nodes, wherein each node from the set of nodes is configured to:
        periodically obtain the configuration information from the configuration server;
        use the configuration information to configure the node to participate in the test; and
        during the test, periodically provide status information associated with the node to a collection server in the content delivery network.

15. The system of claim 14, further comprising:
    a test-analysis apparatus configured to:
        obtain the status information from the collection server;
        display a visual representation of the status information to a user; and
        provide one or more options for updating the visual representation to the user.

16. The system of claim 15, wherein the one or more options comprise at least one of a filter, a sorting option, and a timescale.

17. The system of claim 14, wherein the status information comprises at least one of a playing status, a buffering status, a stalled status, a stopped status, a paused status, and a starting status.

18. The system of claim 13, wherein the configuration information comprises at least one of a start time, an end time, a jitter, an address range, a subnet, a participation percentage, a participation level, a test stream, a hide flag, and a log transmission flag.

19. A non-transitory computer-readable storage medium storing instructions that when executed by a computer cause the computer to perform a method for facilitating content distribution, the method comprising:
    obtaining, at a node in a content delivery network, configuration information for a test of broadcast readiness in the content delivery network from a configuration server in the content delivery network;
    using the configuration information to configure the node to participate in the test, wherein the test comprises using a media delivery application on the node to play content received from the content delivery network without requiring user input to perform the test; and
    during the test, using the node to periodically provide status information associated with the node to a collection server in the content delivery network.

20. The non-transitory computer-readable storage medium of claim 19, the method further comprising:
    initiating the test on the node after a start time of the test from the configuration information is reached; and
    completing the test on the node after an end time of the test from the configuration information is reached.

21. The non-transitory computer-readable storage medium of claim 20, wherein the configuration information further comprises at least one of a jitter, an address range, a subnet, a participation percentage, a participation level, a test stream, a hide flag, and a log transmission flag.

22. The non-transitory computer-readable storage medium of claim 19, wherein the status information comprises at least one of a playing status, a buffering status, a stalled status, a stopped status, a paused status, and a starting status.

* * * * *